US006861950B2

(12) United States Patent
Katou

(10) Patent No.: US 6,861,950 B2
(45) Date of Patent: Mar. 1, 2005

(54) TIRE CONDITION MONITORING APPARATUS

(75) Inventor: Michiya Katou, Ogaki (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/184,004

(22) Filed: Jun. 26, 2002

(65) Prior Publication Data

US 2003/0016126 A1 Jan. 23, 2003

(30) Foreign Application Priority Data

Jun. 28, 2001 (JP) .................................... 2001-195911
Jun. 12, 2002 (JP) .................................... 2002-171612

(51) Int. Cl.[7] ............................................. B60C 23/00
(52) U.S. Cl. .................... 340/447; 340/442; 340/445; 73/146; 73/146.2
(58) Field of Search ............................ 73/146, 146.2, 73/146.5, 756; 340/447, 438, 445, 442, 435, 903, 456, 453, 471; 116/34 R

(56) References Cited

U.S. PATENT DOCUMENTS 5,541,574 A * 7/1996 Lowe et al. ............... 340/447
5,731,516 A * 3/1998 Handfield et al. ......... 73/146.5
5,969,631 A * 10/1999 Ammler et al. ........ 340/825.21
6,430,484 B1 * 8/2002 Takamura et al. .......... 340/447

FOREIGN PATENT DOCUMENTS

GB          WO 96/06747        3/1996

* cited by examiner

Primary Examiner—Davetta W. Goins
(74) Attorney, Agent, or Firm—Boyle Fredrickson Newholm Stein & Gratz S.C.

(57) ABSTRACT

Different types of data included in a signal transmitted by a transmitter, except for synchronous data, are each configured by a binary code signal of a predetermined bit count. The synchronous data is configured by a signal of a pattern different from the bit codes that configure the data other than the synchronous data. This enables a receiver to recognize the synchronous data in the transmitted signal easily and reliably. Further, the data length of the synchronous data is shortened. This shortens the data length of the signal, thus ensuring optimal wireless communication between the transmitter and the receiver.

20 Claims, 3 Drawing Sheets

400μsec 800μsec

400μsec 800μsec

300μsec 700μsec

300μsec 700μsec

TIRE CONDITION MONITORING APPARATUS

BACKGROUND OF THE INVENTION

The present invention relates to tire condition monitoring apparatuses for monitoring the condition of the tires of a vehicle, and, more particularly, to structures of signals transmitted by transmitters, which are attached to the tires.

Conventionally, a wireless type tire condition monitoring apparatus has been used for permitting a driver of a vehicle to monitor the condition of the tires in the passenger compartment. The apparatus includes transmitters, each of which is associated with a different one of the tires and is attached to the tire, and a receiver mounted in the body frame of the vehicle. Each of the transmitters detects the condition of the associated tire, such as the tire pressure and the interior temperature of the tire, and wirelessly transmits a signal including data that indicates the detection results to the receiver. On receiving the signal, the receiver displays the condition of the tire on a display, which is located, for example, near the driver seat, as needed.

FIG. 6 illustrates the structure of the signal transmitted by each transmitter. With reference to the drawing, the signal includes successive, or first to third, data frames. Each of the data frames includes six types of data, which are synchronous data, identification code data, pressure data, temperature data, voltage data, and error detection code data. The synchronous data indicates the beginning of each data frame. The ID code data indicates a specific identification code of each transmitter. The pressure data and the temperature data respectively indicate the tire pressure and the tire interior temperature. The voltage data indicates the voltage of a battery, which is the power source of each transmitter. The error detection data permits the receiver to judge whether or not each data frame has an error. The first to third data frames are identical. In other words, each transmitter repeats transmission of the same data frame, which includes the above-described six types of data, for three consecutive times.

In each data frame, the six types of data are each configured by a binary code signal of a predetermined bit count. The bit code "0" is either one of the two types of square wave signals shown in FIG. 7(a), one cycle of which lasts 800 microseconds. The bit code "1" is either a high or low level signal shown in FIG. 7(b), one cycle of which lasts 800 microseconds. That is, the bit code "1" is configured by a so-called bi-phase signal.

In each data frame, each of the data other than the synchronous data is an 8 bit data. The data portion corresponding to the last bit of the 8 bit data is an end code indicating the completion of the 8 bit data. The end code of each 8 bit data is different from the end code of the preceding data. The synchronous data is configured by repeating the same code "0" or "1" consecutively for 8 bits or more, for example, 16 bits.

In each data frame, only the synchronous data is configured by the single code that is repeated consecutively for 8 bits or more. Thus, when the receiver receives the signal from a certain one of the transmitters, the receiver reliably recognizes the synchronous data in the signal. This enables the receiver to accurately read out the other five data, which are preceded by the synchronous data. In other words, if the synchronous data is unrecognizable, the receiver is not permitted to read out the content of the received signal.

As long as the tires are in normal condition, the transmitters transmit data at predetermined time intervals. However, when the engine of the vehicle is stopped, the receiver is operated intermittently to save the vehicle's battery. More specifically, as long as the vehicle engine is held as stopped, the operation of the receiver remains non-continuous, or the receiver is permitted to receive data from the transmitters only intermittently after predetermined waiting periods.

Thus, during the intermittent operation, it is difficult for the receiver to receive the signal of the transmitters from the beginning of the signal. That is, the receiver in the intermittent operation usually starts to receive the transmitted signal after the signal transmission has already started. However, each of the waiting periods of the intermittent operation is shorter than or equal to the time needed for each transmitter to transmit a single data frame. Further, when the receiver receives a signal from a certain one of the transmitters on resuming its operation during the intermittent operation, the receiver is held as activated until the signal reception is completed, regardless of the intermittent operation. Thus, even if the receiver is not permitted to receive the first data frame of the transmitted signal from the beginning of the first data frame, the receiver may be permitted to fully receive the second and third data from the beginning of each of the data frames. In other words, even in the intermittent operation, the receiver is permitted to complete reception of at least one data frame of the transmitted signal. This enables the receiver to obtain necessary information from the transmitted signal.

The synchronous data of each data frame only indicates the beginning of the data frame. That is, unlike the other five types of data (the 8 bit data, such as the pressure data), the synchronous data does not include any information that must be transmitted from the transmitters to the receiver. Thus, in order to shorten the data length (the total bit count) of the signal transmitted by the transmitters, it is desirable that the bit count of the synchronous data be relatively small. However, as described, the conventional synchronized data is configured by the codes of the bit count greater than or equal to the bit counts of the data other than the synchronous data. The transmitted signal thus has a relatively long data length, thus prolonging the time needed for transmitting the signal. This shortens the life of the battery incorporated in each transmitter.

Further, when the vehicle is traveling, the transmitters rotate integrally with the tires such that the orientation of each transmitter continuously changes relative to the receiver. Since a transmitting antenna of each transmitter and a receiving antenna of the receiver are both directional, the rotational angles of the tires greatly affect the reception level of the receiver with respect to the transmitted signal. That is, the signal reception level of the receiver may become lower than an acceptable level depending on the rotational angles of the tires. Thus, if each data frame has a relatively long data length and the time needed for transmitting the data frame is prolonged, the signal reception level of the receiver may become unacceptable during the reception of the data frame. In this case, it is highly likely that the receiver becomes incapable of completing reception of any data frame. Accordingly, to improve the reception reliability of the receiver, the data length of each data frame must be minimized such that the data frame can be transmitted in a minimum time. However, as described, the conventional synchronous data has a relatively large bit count, thus increasing the bit count of each data frame. The reception reliability of the receiver is thus lowered.

SUMMARY OF THE INVENTION

It is an objective of the present invention to provide a tire condition monitoring apparatus that minimizes the data length of a transmitted signal.

To achieve the foregoing and other objectives and in accordance with the purpose of the present invention, the invention provides a tire condition monitoring apparatus for monitoring the condition of a tire attached to a vehicle. The apparatus includes a transmitter and a receiver. The transmitter is driven by a battery for detecting the condition of the tire and wirelessly transmitting a signal including condition data that indicates the detected tire condition. The receiver receives the signal transmitted by the transmitter and processes the received signal. The signal transmitted by the transmitter includes synchronous data, which is provided at the beginning of the transmitted signal. The data included in the transmitted signal other than the synchronous data are each configured by a binary code signal. The synchronous data is configured by a specific signal that has a pattern different from the binary code signal.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which.

DETAILED DESCRIPTION OF THE PREFERRED DRAWINGS

Figure 1:
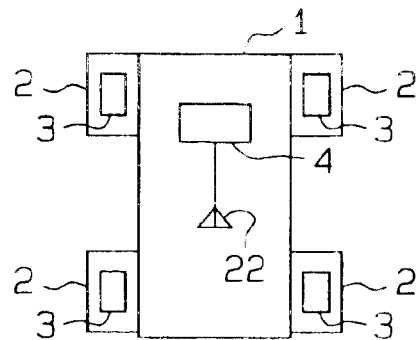
FIG. 1 is a view schematically showing a tire monitoring apparatus according to an embodiment of the present invention.

An embodiment of the present invention will now be described with reference to FIGS. 1 to 4(a). With reference to FIG. 1, a tire condition monitoring apparatus includes four transmitters 3, each of which is associated with a different one of four tires 2 of a vehicle 1 and is attached to the tire 2, and a receiver 4 installed in the body frame of the vehicle 1. Each transmitter 3 is fixed to the wheel to which the associated tire 2 is attached such that the transmitter 3 is located in the interior of the tire 2. Each transmitter 3 detects the condition of the associated tire 2, such as the tire pressure and the interior temperature, and wirelessly transmits a signal including data that indicates the tire condition. The receiver 4 receives the signal wirelessly transmitted by each transmitter 3 and processes the received signal.

Figure 2:
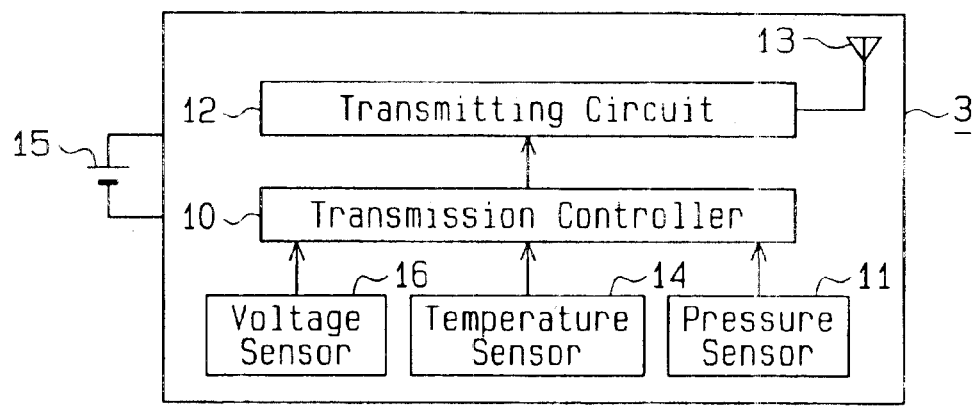
FIG. 2 is a block diagram indicating the circuit of a transmitter installed in the apparatus of FIG. 1.

With reference to FIG. 2, each transmitter 3 has a transmission controller 10, which is, for example, a microcomputer. The transmitter controller 10 includes, for example, a central processing unit (CPU), a random access memory (RAM), and a read only memory (ROM). The transmission controller 10 stores specific identification data (a specific identification code). The ID codes of the transmitters 3 identify each of the transmitters 3 installed in the vehicle 1.

In each transmitter 3, a pressure sensor 11 measures the pressure in the interior of the associated tire 2 and provides the transmission controller 10 with pressure data, which is obtained from the measurement. Further, a temperature sensor 14 measures the temperature in the interior of the tire 2 and provides the transmission controller 10 with temperature data, which is obtained from the measurement.

Each transmitter 3 has a battery 15, which powers the transmitter 3. A voltage sensor 16 of each transmitter 3 measures the voltage of the battery 15 and provides the transmission controller 10 with voltage data, which is obtained from the measurement.

The transmission controller 10 sends data including the pressure data, the temperature data, the voltage data, and the identification code to a transmitting circuit 12. The transmitting circuit 12 encodes and modulates the data received from the transmission controller 10. The transmitting circuit 12 then wirelessly sends a signal including the data by a transmitting antenna 13.

The transmission controller 10 of each transmitter 3 controls the sensors 11, 14, 16 to perform measurement at predetermined time intervals (for example, every 15 seconds). Also, the transmission controller 10 controls the transmitting circuit 12 to perform periodical transmission every time the pressure sensor 11 completes a predetermined number of (for example, 40 cycles of) measurements. However, when acknowledging a non-normal value of the pressure or interior temperature of the associated tire 2, the transmission controller 10 causes the transmitting circuit 12 to transmit data immediately, regardless of the periodical transmission.

Figure 3:
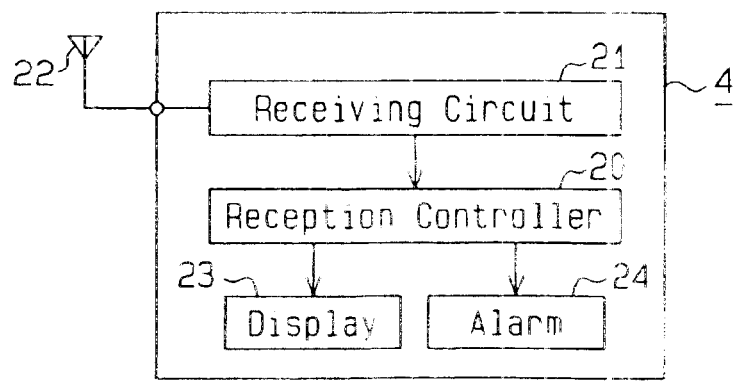
FIG. 3 is a block diagram indicating the circuit of a receiver installed in the apparatus of FIG. 1.

The receiver 4, which is shown in FIG. 3, is powered by a battery (not shown) installed in the vehicle 1. The receiver 4 includes a reception controller 20, which is, for example, a microcomputer. The reception controller 20 includes, for example, a CPU, an RAM, and an ROM.

When a certain one of the transmitters 3 transmits a signal, a receiving circuit 21 of the receiver 4 receives the signal by at least one receiving antenna 22, which is connected to the receiver 4. The receiving circuit 21 demodulates and decodes the received signal and sends the data to the reception controller 20. Based on the data from the receiving circuit 21, the reception controller 20 acknowledges the pressure and interior temperature of the tire 2 that is associated with the transmitter 3, which is the source of the received signal. The reception controller 20 also acknowledges the voltage of the battery 15 that powers the transmitter 3.

The reception controller 20 controls a display 23 to display information regarding the pressure and interior temperature of each tire 2 and the voltage of each battery 15. The display 23 is located at a position visible from the driver of the vehicle 1. Further, the reception controller 20 causes an alarm 24 to warn the driver of the vehicle 1 of, if any, a non-normal state of the pressure or the interior temperature or the voltage of the battery 15 regarding each of the tires 2. The alarm 24 may be a device that generates sound or light for alarming the driver. Alternatively, the display 23 may warn the driver of the non-normal state of the pressure or the interior temperature or the voltage of the battery 15 regarding each tire 2.

The reception controller 20 judges whether or not the engine of the vehicle 1 is being driven depending on, for example, an ignition signal generated by the key switch of the vehicle 1. If the judgment is positive, the reception controller 20 holds the receiving circuit 21 in a constantly receivable state (a constant operation mode of the receiver 4). In contrast, if the judgment is negative, the reception controller 21 holds the receiving circuit 21 in an intermittently receivable state (an intermittent operation mode of the receiver 4). In other words, the reception controller 20 repeats operation cycles of the receiving circuit 21, in each of which the receiving circuit 21 is held as operated for a predetermined operation time and then in a waiting state for a predetermined waiting time.

However, if the reception controller 20 acknowledges a signal from a certain one of the transmitters 3 with the receiving circuit 21 held in a receivable state during the intermittent operation mode, the reception controller 20 continuously maintains the receiving circuit 21 in the receivable state until the reception of the signal is completed.

Figure 4A:
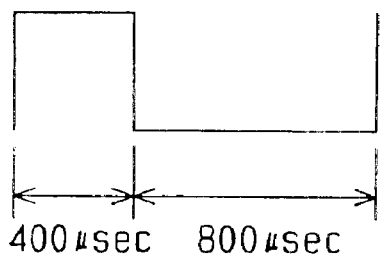
FIGS. 4(a) and 4(b) are views each explaining a pattern of synchronous data.
Figure 4B:
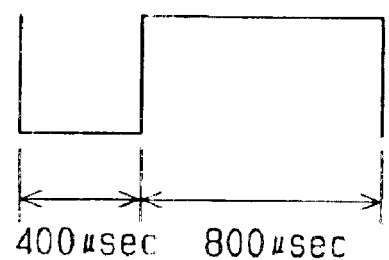
Figure 6:
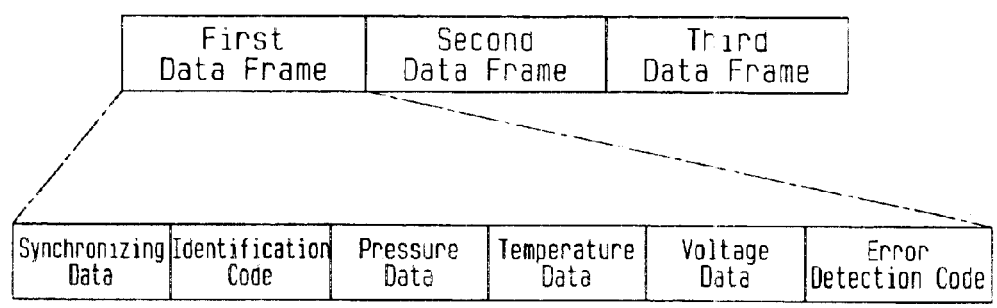
FIG. 6 is a view explaining the structure of a transmitted signal.
Figure 7A:
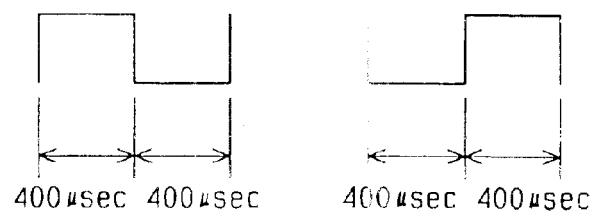
FIG. 7(a) is a view explaining a bit code "0" that configures data included in the transmitted signal.
Figure 7B:
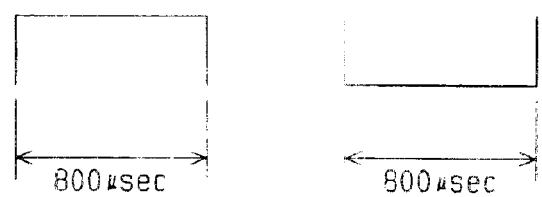
FIG. 7(b) is a view explaining a bit code "1" that configures data included in the transmitted signal.

The structure of the signal transmitted by the transmitters 3 and the bit code structures of the data included in the transmitted signal are the same as those illustrated in FIGS. 6 to 7(b), except for the synchronous data. Thus, only the structure of the synchronous data will hereafter be explained. In this embodiment, with reference to FIGS. 4(a) and 4(b), the synchronous data is configured by a signal of a pattern different from the bit codes that configure the data other than the synchronous data (see FIGS. 7(a) and 7(b)). More specifically, as illustrated in FIG. 4(a), the synchronous data of this embodiment is configured by a combination of a high level signal that lasts 400 microseconds and a low level signal that lasts 800 microseconds. Alternatively, as illustrated in FIG. 4(b), the synchronous data may be configured by a combination of a low level signal that lasts 400 microseconds and a high level signal that lasts 800 microseconds. The synchronous data corresponds to the single cycle of the signal pattern, which is illustrated in FIG. 4(a) or 4(b).

As described, the synchronous data of the signal transmitted by the transmitters 3 is configured by the signal of the pattern different from the bit codes that configure the data other than the synchronous data. In other words, the synchronous data is configured by a specific signal that has a pattern different from a normal binary code signal, which indicates "0" or "1". This permits the reception controller 20 to recognize the synchronous data in the signal easily and reliably when receiving the signal from the transmitters 3.

Further, the data length of the synchronous data of this embodiment is relatively short, as compared to the conventional synchronous data, which includes 8 bit codes or more. In other words, since the synchronous data of this embodiment is configured by the signal of the pattern different from the bit codes that configure the data other than the synchronous data, the data length of the synchronous data is shortened. This shortens the data length of each of the data frames, which includes the synchronous data, and the data length of the transmitted signal including the three data frames, as compared to the conventional data.

Accordingly, the time needed for transmitting the signal is shortened, thus prolonging the life of each battery 15, which powers the associated transmitter 3. Further, the time needed for transmitting each of the data frames is shortened. It is thus less likely that the reception level of the receiver 4 drops to an unacceptable level when the receiver 4 is reading out the data frames as the vehicle 1 is moving. This improves the reception reliability of the signal transmitted by the transmitters 3, thus optimizing the wireless communication between the transmitters 3 and the receiver 4.

With reference to FIGS. 4(a) and 4(b), the synchronous data of this embodiment employs a part of the bit codes that configure the data other than the synchronous data (see FIGS. 7(a) and 7(b)). More specifically, the synchronous data of this embodiment is configured by combining a portion of the pattern of the bit code "0" corresponding to a half cycle, referring to FIG. 7(a), with the pattern of the bit code "1" corresponding to a full cycle, which is shown in FIG. 7(b). This simplified a process for generating the synchronous data, as compared to the case in which the synchronous data is configured by a signal of a pattern that is totally unrelated to the normal binary code signal indicating "0" or "1".

The illustrated embodiment may be modified as follows.

Figure 5A:
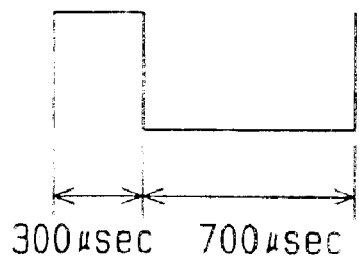
FIGS. 5(a) and 5(b) are views each explaining a modification of the pattern of the synchronous data.
Figure 5B:
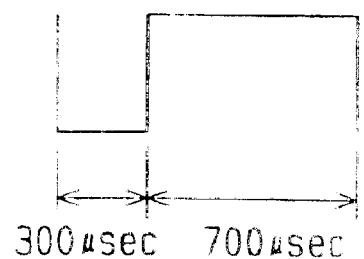

The synchronous data is not restricted to the signal that has the pattern shown in FIG. 4(a) or 4(b). That is, the synchronous data may be any signal, as long as the pattern of the signal is different from the bit codes that configure the data other than the synchronous data. For example, with reference to FIG. 5(a), the synchronous data may be configured by a combination of a high level signal that lasts 300 microseconds and a low level signal that lasts 700 microseconds. Alternatively, with reference to FIG. 5(b), the synchronous data may be configured by a combination of a low level signal that lasts 300 microseconds and a high level signal that lasts 700 microseconds. Also, the synchronous data does not necessarily have to be configured by combining a high level signal with a low level signal. The synchronous data may be configured by only the high level signal or the low level signal.

The number of the data frames included in a single transmitted signal, or the number of the data frames transmitted in a single cycle of transmission, does not necessarily have to be three. That is, one, two, or four or more data frames may be included in the transmitted signal.

The present examples and embodiments are to be considered as illustrative and not restrictive and the invention is not to be limited to the details given herein, but may be modified within the scope and equivalence of the appended claims.

What is claimed is:

1. A tire condition monitoring apparatus for monitoring the condition of a tire attached to a vehicle, comprising:

a transmitter, wherein the transmitter is driven by a battery for detecting the condition of the tire and wirelessly transmitting a signal including condition data that indicates the detected tire condition; and a receiver, wherein the receiver receives the signal transmitted by the transmitter and processes the received signal;

wherein:

the signal transmitted by the transmitter includes synchronous data, which is provided at the beginning of the transmitted signal;

the data included in the transmitted signal other than the synchronous data is configured by a binary code signal;

the synchronous data is configured by a specific signal that has a pattern different from the binary code signal; and the synchronous data is configured of a high level signal alternately timed with a low level signal.

2. The apparatus according to claim 1, wherein the synchronous data is a signal corresponding to one cycle that is configured by a combination of a high level for a first timed interval and a low level signal for a second time interval different from the first timed interval.

3. The apparatus according to claim 1, wherein the configuration of the synchronous data includes a portion of a pattern of the binary code signal.

4. The apparatus according to claim 1, wherein the synchronous data is configured by combining portions of patterns of bit codes "0" and "1", which configure the binary code signal.

5. The apparatus according to claim 1, wherein the transmitted signal includes successive data frames, and the synchronous data is provided at the beginning of each of the data frames.

6. A transmitter of a tire condition monitoring apparatus, wherein the transmitter is driven by a battery and comprises:

a sensor for detecting the condition of a tire; and a transmitting circuit, wherein the transmitting circuit generates a signal including condition data that indicates the detected tire condition and wirelessly transmits the signal;

wherein:

the transmitted signal includes synchronous data, which is provided at the beginning of the transmitted signal;

the data included in the transmitted signal other than the synchronous data is configured by a binary code signal;

the synchronous data is configured by a specific signal that has a pattern different from the binary code signal; and the synchronous data is configured of a high level signal alternately timed with a low level signal.

7. The transmitter according to claim 6, wherein the synchronous data is a signal corresponding to one cycle that is configured by a combination of a high level signal for a first timed interval and a low level signalfor a second time interval different from the first timed interval.

8. The transmitter according to claim 6, wherein the configuration of the synchronous data includes a portion of a pattern of the binary code signal.

9. The transmitter according to claim 6, wherein the synchronous data is configured by combining portions of patterns of bit codes "0" and "1", which configure the binary code signal.

10. The transmitter according to claim 6, wherein the transmitted signal includes successive data frames, and the synchronous data is provided at the beginning of each of the data frames.

11. A method of monitoring the condition of a tire using a transmitter and a receiver, the method comprising the steps of:

detecting a condition of a tire and generating a corresponding data signal, wherein the data signal includes synchronous data and information data; and configuring the data signal such that the synchronous data has a pattern that is different than the binary code pattern of the information data so as to shorten the length of the data signal, wherein the configuring step is such that the pattern of the synchronous data includes a high level signal alternately timed with a low level signal.

12. The method of claim 11, further comprising the steps of:

transmitting the data signal to the receiver; and receiving the data signal with the receiver.

13. The method of claim 12, wherein said receiving step is performed intermittently.

14. The method of claim 12, wherein said receiving step is preformed at a predetermined time interval.

15. The method of claim 11, wherein the synchronous data is a signal corresponding to one cycle that is configured by a combination of a high level signal for a first timed interval and a low level signal for a second time interval different from the first timed interval.

16. The method of claim 11, wherein the information data is configured by a binary code signal.

17. The method of claim 11, wherein the synchronous data is configured by combining portions of bit code "0" and "1" which are used to configure the information data as a binary code signal.

18. A tire condition monitoring apparatus for monitoring the condition of a tire attached to a vehicle, comprising:

a transmitter that detects a condition of the tire and wirelessly transmits a signal indicative of the tire condition;

wherein the signal transmitted by the transmitter includes both synchronous data and data other than the synchronous data;

wherein the data other than the synchronous data is configured by a binary code signal and the synchronous data is configured by a signal that has a pattern different from the binary code signal; and wherein the synchronous data is configured of a high level signal alternately timed with a low level signal.

19. The apparatus according to claim 18, wherein the synchronous data is a signal corresponding to one cycle that is configured by a combination of a high level signal and a low level signal.

20. The apparatus according to claim 18, wherein the configuration of the synchronous data includes a portion of a pattern of the binary code signal.

* * * * *